United States Patent
Duke

(10) Patent No.: US 7,458,077 B2
(45) Date of Patent: Nov. 25, 2008

(54) SYSTEM AND METHOD FOR DYNAMICALLY ADJUSTING A THREAD SCHEDULING QUANTUM VALUE

(75) Inventor: Jeremy P. Duke, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 10/816,112

(22) Filed: Mar. 31, 2004

(65) Prior Publication Data

US 2005/0240923 A1    Oct. 27, 2005

(51) Int. Cl.
*G06F 9/46* (2006.01)

(52) U.S. Cl. .................................. 718/102; 718/100

(58) Field of Classification Search ................. 718/102, 718/103, 100; 717/151; 702/182, 183
See application file for complete search history.

(56) References Cited

U.S. PATENT DOCUMENTS

| 5,325,525 A * | 6/1994 | Shan et al. ................. 718/104 |
| 2002/0138542 A1 * | 9/2002 | Bollella et al. .............. 709/102 |

* cited by examiner

*Primary Examiner*—Meng-Ai An
*Assistant Examiner*—Camquy Truong
(74) *Attorney, Agent, or Firm*—Blakely, Sokoloff, Taylor & Zafman LLP

(57) ABSTRACT

A method and system optimizes thread scheduling by receiving thread objective data that includes a performance objective, sampling performance metric data points, wherein each data point varies as a function of scheduling quantum values, and calculating a new scheduling quantum value by processing the performance metric data points according to the performance objective. A process manager adjusts the scheduling quantum value to increase thread performance by utilizing the calculated scheduling quantum value.

33 Claims, 5 Drawing Sheets

SYSTEM AND METHOD FOR DYNAMICALLY ADJUSTING A THREAD SCHEDULING QUANTUM VALUE

FIELD

Embodiments of the invention relate generally to the field of microprocessor scheduling and, more specifically, dynamic process and thread scheduling within an operating system.

BACKGROUND

Recently, people rely on personal computers (PC) for work and entertainment. Word processing programs, multimedia players, games, and increasingly, home networking applications are just a few examples of the most commonly used applications. Consequently, at any given moment, a user may be listening to music, composing a document and surfing the Internet in a single user session. Fortunately, modern PC operating systems, such as Microsoft's Windows® or the Linux® operating systems are able to multitask such that many applications, and more specifically, each of their constituent threads, seemingly execute concurrently. A thread is a portion of computer code an application needs processed by the central processing unit of a computer.

Most computer processors are only able to execute one thread at a time so modern operating systems rapidly switch between available threads giving the appearance of concurrent execution, otherwise known as multitasking. Multitasking in a computer is accomplished by an operating system component called the scheduler or also known as the process manager. The scheduler is responsible for: 1) evaluating which thread to run; and 2) switching the threads, if necessary. The time period between evaluations is called the scheduler quantum value and the switching of threads is called a context switch. The scheduler makes the context switch between different threads if any of these three occur: 1) a specific duration or quantum of time (scheduler quantum value) has occurred; 2) the thread has given up the CPU voluntarily (e.g., application is closed or the thread goes into an idle state); or 3) the thread is preempted by a higher priority thread.

A problem arises, however, when a particular application does not get a sufficient quantum of time, defined by the scheduler quantum value, to properly execute before another evaluation occurs. For example, a multimedia application playing music may not have a sufficient quantum of time to efficiently execute its thread before another scheduler evaluation. As a result, the user is dissatisfied when the music does not play properly. If the application has too large a quantum value, it may be consuming more time than it really needs to execute efficiently and other concurrently running applications may appear sluggish. In some cases, the application or system may crash.

One solution has been for application designers to provide a specific scheduler quantum to the OS to utilize while running their application. However, these fixed values do not take into account what other applications may be concurrently running and are essentially a best guess. For example, if an OS utilized only one application's specific fixed quantum value, other applications concurrently executing may not adequately perform to a user's expectations or the fixed value may not provide adequate scheduling to accommodate for the wide variety of other applications that may be running.

BRIEF DESCRIPTION OF THE DRAWINGS

Disclosed embodiments of the invention are illustrated by way of example and not limitation in the figures of the accompanying drawings, in which like references indicate similar elements and in which.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
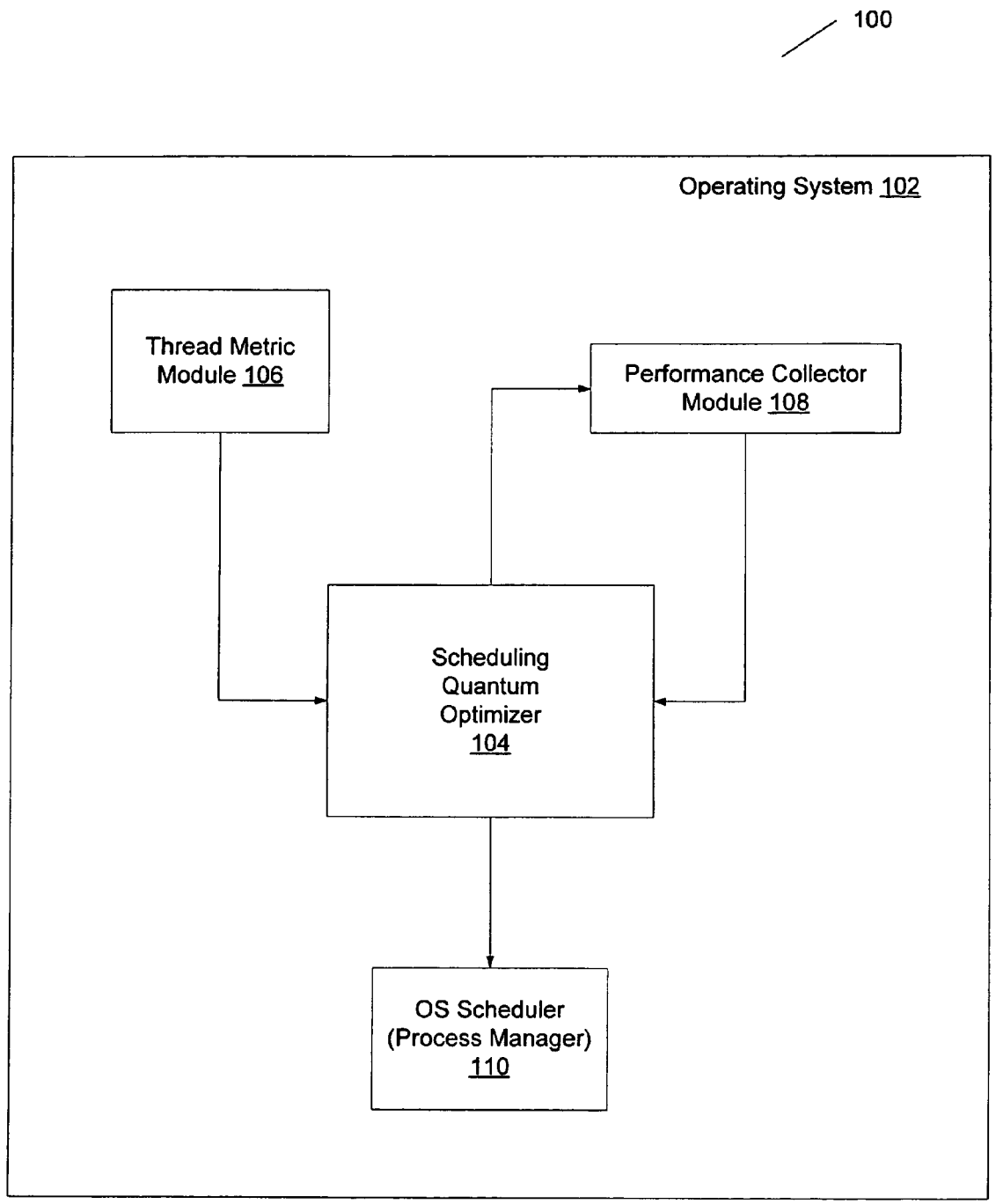
FIG. 1 is a block diagram illustrating a dynamic thread scheduling system, according to one embodiment of the invention.

FIG. 1 is a block diagram illustrating a dynamic thread scheduling system 100, wherein a scheduler quantum value is determined, according to one embodiment of the invention. The dynamic thread scheduling system 100 includes operating system (OS) 102, which manages application execution and provides an architecture for interactions between software and hardware elements, such as those illustrated with reference to FIG. 5. The blocks illustrated in FIG. 1 are shown within the operating system 102 to illustrate an implied interaction between these blocks and the operating system 102 and should not be construed in a limiting sense. For example, operating system 102 may include multiple modules.

A thread metric module 106 provides a scheduling quantum optimizer 104 with thread objective data that includes at least one performance metric parameter and a performance objective. In one embodiment, the thread metric module 106 may be an application program interface associated with an executing application and configured to provide the performance metric parameter and the performance objective to the scheduling quantum optimizer 104. In another embodiment, a driver associated with corresponding computer hardware may provide the thread objective data to the scheduling quantum optimizer 104. The details of the thread objective data will be discussed in further detail below.

Based upon the performance metric parameter and the performance objective, the scheduling quantum optimizer 104 communicates to a performance collector module 108 which performance metric to measure and communicates back to the scheduling quantum optimizer 104. Among various embodiments, the performance collector module 108 may be implemented in software, such as embedded into Intel's® Vtune performance analyzer, or in hardware, such as Intel's® Xscale architecture. The details of the sampling the performance metric data will be discussed in further detail below.

As a result of receiving and processing the performance metric data from the performance collector module 108, the scheduling quantum optimizer 104 calculates scheduler quantum value and communicates this value to the (operating system) OS scheduler 110, or a process manager. The OS scheduler 110 may then adjust the current scheduler quantum value to the calculated quantum scheduler value. In one embodiment, the scheduling quantum optimizer 104 may be built directly into the operating system 102, or in another embodiment, it may be layered above the operating system 102 as a system service. The details of the performance metric data processing will be discussed in further detail below.

Figure 2:
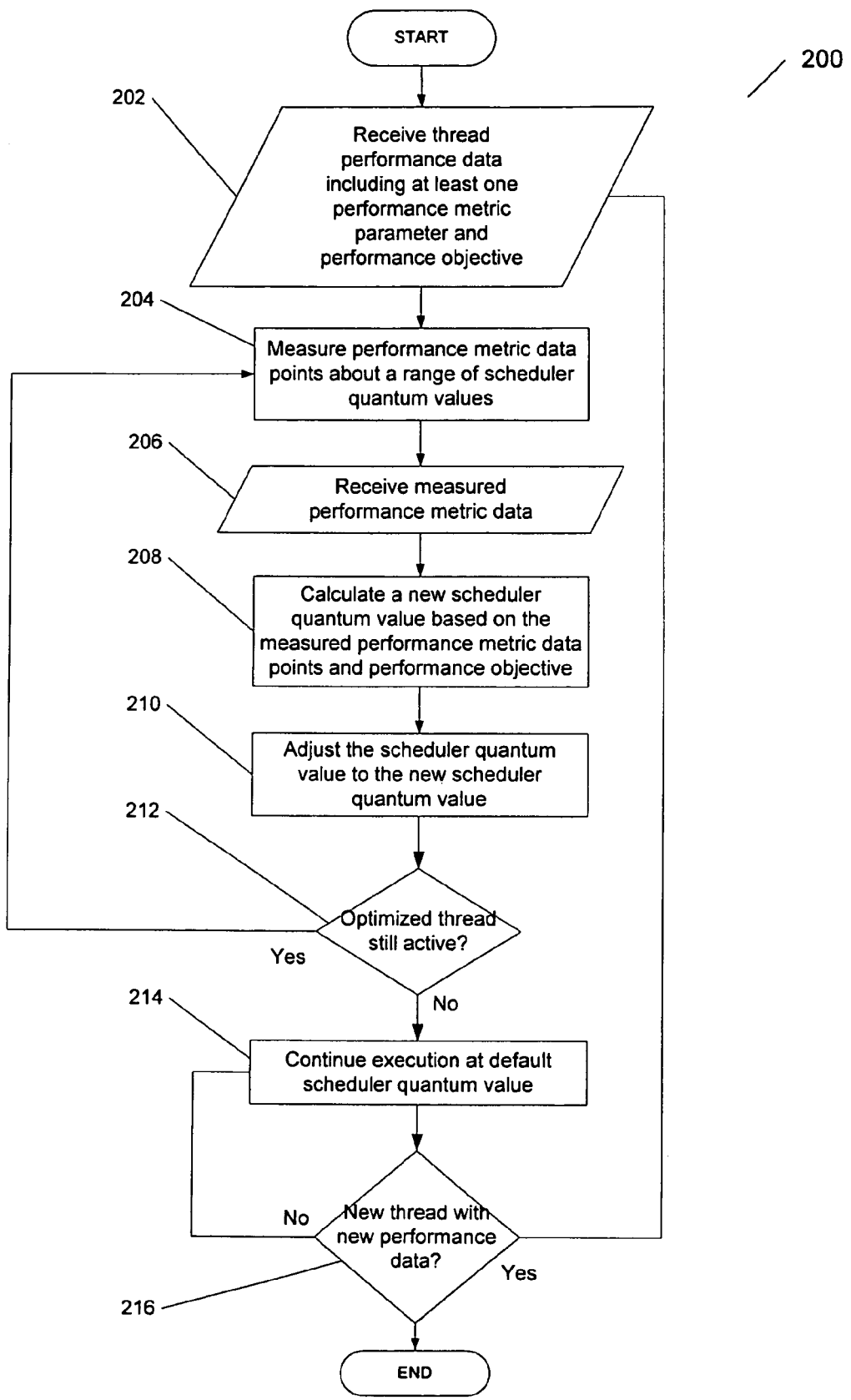
FIG. 2 is a flowchart illustrating a dynamic thread scheduling method, wherein a scheduler quantum value is determined based upon real-time processing of thread performance metric data, according to one embodiment of the invention.

FIG. 2 is a flowchart illustrating a dynamic thread scheduling method 200, wherein a scheduler quantum value is determined based upon real-time processing of thread performance metric data, according to one embodiment of the invention.

As discussed above, the thread metric module 106 provides the scheduling quantum optimizer 104 with thread objective data, including at least one performance metric parameter and a performance objective (operation 202). In one embodiment, the performance metric parameters include at least one of a performance metric type, a performance collector sample rate, a sample window size, and a sample interval. The sample window size is a scheduler quantum value range or window of sampled performance metric data points. As each new sample is acquired, the window's starting and ending points correspondingly slide to include the newly acquired sample. The sample interval may be a value added or subtracted from each successive scheduler quantum value per sample. For example, a sample window size may be 200 ms (milliseconds) with a sample interval of 2 ms results in 100 samples (200 ms/2 ms per sample) within the defined window. The sample rate is the speed at which those samples are acquired (e.g., one sample per 200 ms). In various embodiments, the OS scheduler 110 or the scheduling quantum optimizer 104 may set at least one of a sample rate, a sample window size, and a sample interval. The thread performance data depends on what aspect or performance metric type the application needs optimized. For example, for an MP3 (MPEG audio layer-3 (Motion Picture Expert Group)) decoder executing on a portable media device, the performance metric to optimize may correspond to the time required to decode one audio frame, and the performance objective may be to find a scheduler quantum value corresponding to the smallest frame decode time.

At operation 204, the performance collector module 108 samples performance metric data based upon parameters supplied by the thread objective data. In one embodiment, the performance collector module 108 sends performance metric data to the scheduling quantum optimizer 104 in a serial fashion on a real-time basis, where the scheduling quantum optimizer 104 may store the data or otherwise have access to the data for further processing. In another embodiment, the performance collector module 108 stores a predetermined number of performance metric data points prior to communicating those data points to scheduling quantum optimizer 104.

Continuing at operation 206, the scheduling quantum optimizer 104 receives the measured performance metric data from the performance collector module 108. The scheduling quantum optimizer 104 calculates a new scheduler quantum value based on the sampled performance metric data points and performance objective (operation 208). At operation 210, the OS scheduler 110 receives and implements the new scheduler quantum value. If the optimized thread is still active (operation 212), the process returns to operation 204 to continue the process based upon the new scheduler quantum value. However, if the optimized thread is no longer active (e.g., the application has terminated that thread or the thread has completed), the OS scheduler 110 may continue at the last scheduler quantum value or may revert back to a default value (operation 214). If a new thread with optimized data becomes active (operation 216) the system flows to operation 202 where the process begins again with new thread performance data; otherwise, the system continues execution at operation 214.

The scheduling quantum optimizer 104 may use any number of algorithms to calculate the scheduler quantum value. For example, a 'hill climber' algorithm might be implemented such that a performance metric data points are acquired within a calculation window size of (t–n) to (t+n) scheduler quantum values, and evaluated for a given performance objective and algorithm, as illustrated in the following operations of a 'hill climber' algorithm:

Operation 1. Sample a first performance metric data point (m1) at current scheduler quantum value (t);

Operation 2. Sample a second performance metric data point (m2) at scheduler quantum value (t–n), where (t–n) is decreases the scheduler quantum value by n;

Operation 3. Sample a third performance metric data point (m3) at scheduler quantum value (t+n), where (t+n) is increases the scheduler quantum value by n, where operations 1 to 3 correspond to operation 204;

Operation 4. Receive and compare (m1), (m2), and (m3) and set the scheduler quantum value to the new scheduler quantum value as defined by the performance objective (e.g., set scheduler quantum value to (t) value corresponding to a minimum of (m1), (m2), and (m3), where operation 4 corresponds to operations 206 and 208;

Operation 5. Start operation 1 again using new scheduler quantum value determined in operation 4 as "current" scheduler quantum setting (t).

Figure 3:
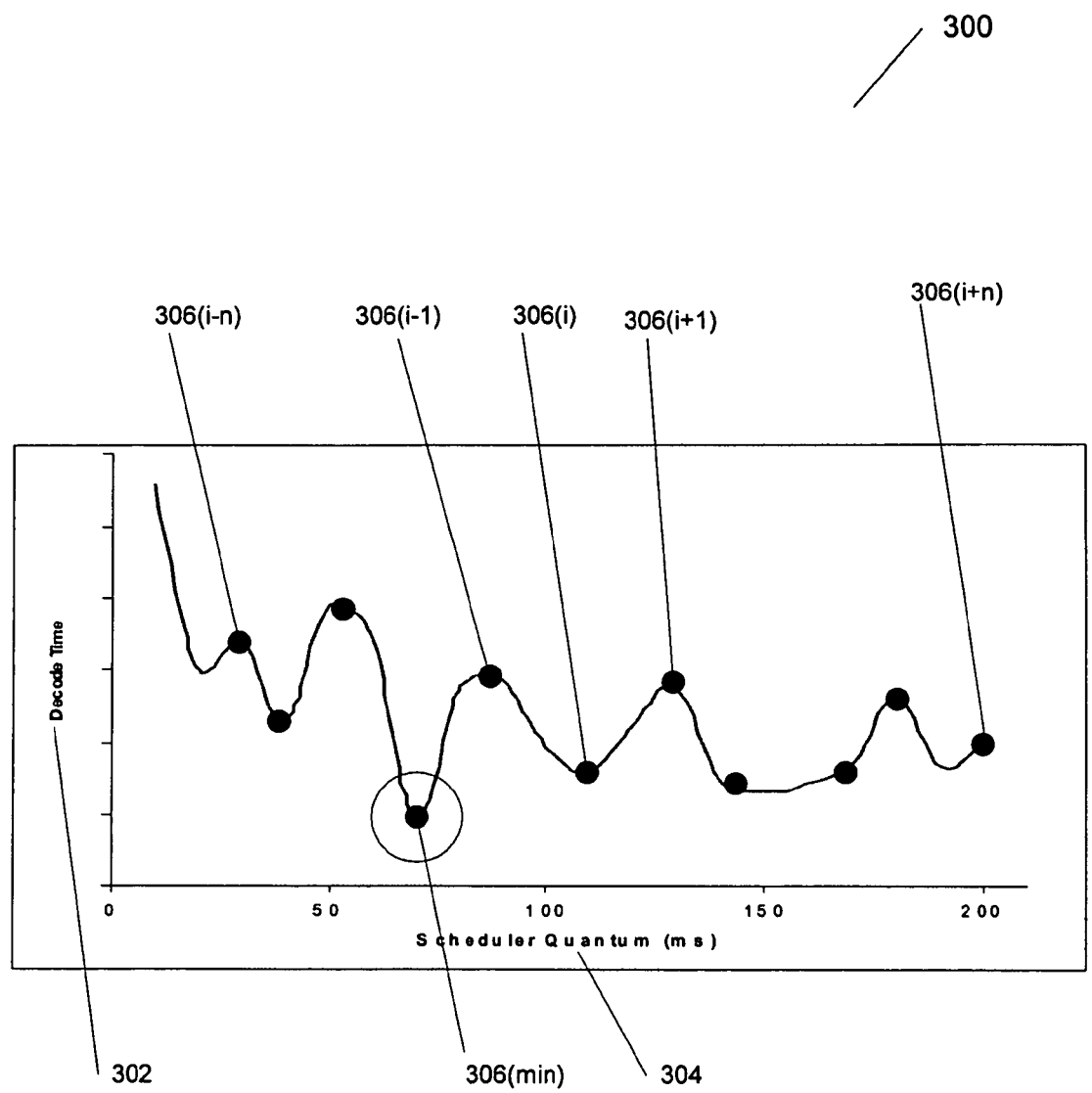
FIG. 3 is a graphical chart illustrating a thread metric graph, according to one embodiment of the invention.

FIG. 3 is a graphical chart illustrating a thread performance graph 300, according to one embodiment of the invention. The thread performance graph 300 includes a set of performance metric data points about a range of scheduler quantum values, wherein a new scheduler quantum value is determined based upon a 'hill climber' algorithm, as described above. The performance metric being measured, in this example, is a decode time 302. The decode time 302 may represent, for example, the decode time required to decode one frame of information, such as an audio or video frame for a corresponding scheduler quantum value 304. In such cases for decoding audio or video on devices, such as a portable media player, the decode time is critical to how the playback is experienced by a user. For example, a video clip running at 30 frames per second, if not decoded fast enough, may freeze or become jerky. Therefore it is desirable to find a scheduler quantum value such that the decode time is minimized to eliminate or lessen the effects of processor intensive functions, such as audio/video playback, particularly while executing concurrently with other applications.

Using the 'hill climber' algorithm, an initial data point 306(i) is acquired by the performance collector module 108 corresponding to an initial decode time and scheduler quantum value. Those values are received and may be stored in a memory storage medium accessible by the scheduling quantum optimizer 104. Next, the scheduler quantum value is incremented by the scheduling quantum optimizer 104 to a value of (i+1, where i is the sample interval), and another data point 306(i+1) is taken and stored. This process repeats until the last data point, 306(i+n) is received and stored. Similarly, the process repeats for decrementing the scheduler quantum value, wherein a data point 306(i−1), is acquired and stored. Again, this process repeats until the last data point, 306(i−n), is received and stored. If the performance objective is to find a scheduler quantum value that reduces decode time, it is clear from a simple graphing function that the shortest decode time and associated scheduler quantum value correspond to the data point 306(min). The process then repeats with the scheduler quantum value corresponding to 306(min) becoming the new initial scheduler quantum value for the 'hill climber' algorithm. As previously mentioned, the 'hill climber' algorithm is one of many algorithms known that could be applied to sampling and filtering data to achieve a performance objective.

Figure 4:
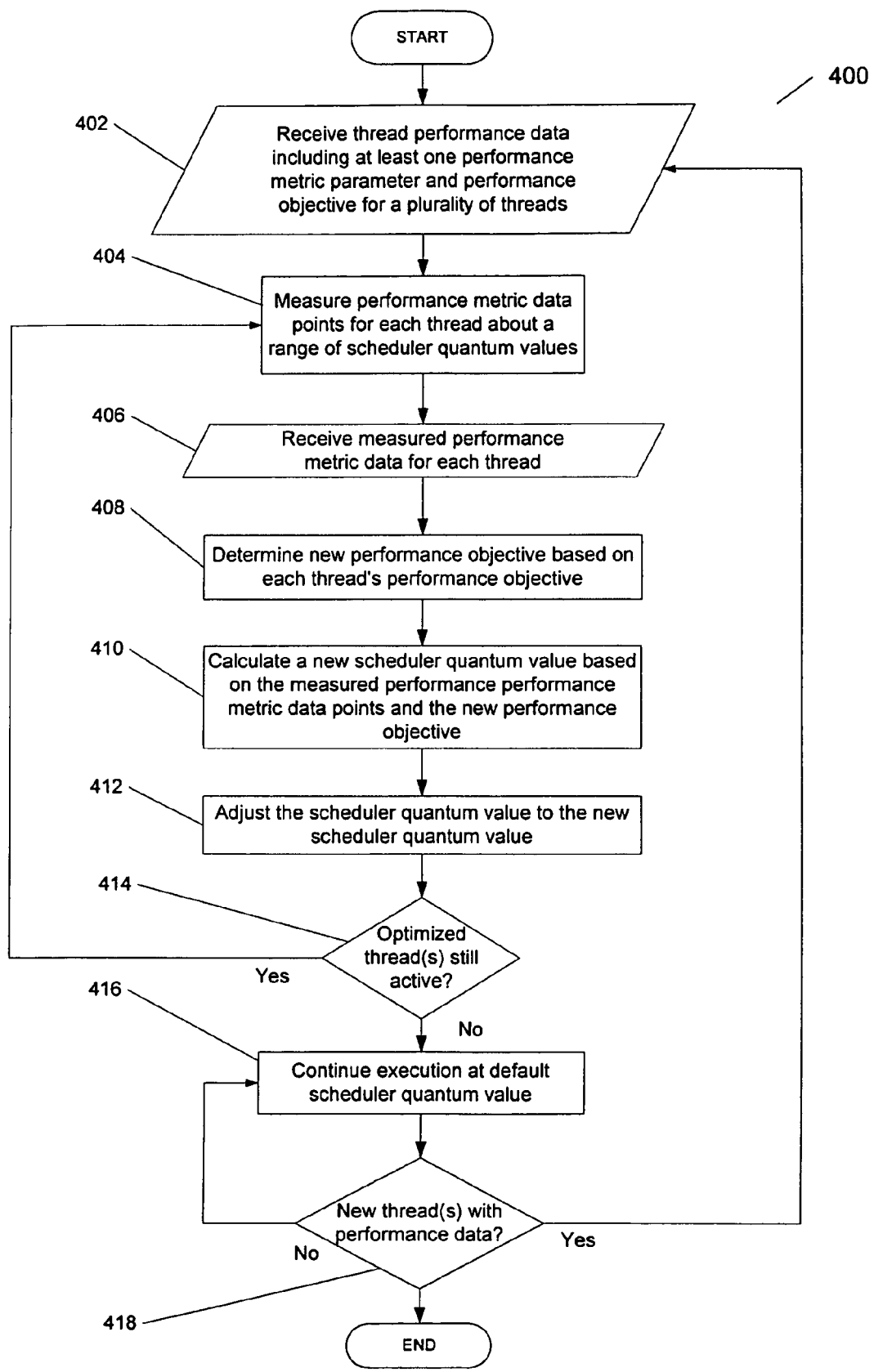
FIG. 4 is a flowchart illustrating a dynamic thread scheduling method, wherein a scheduler quantum value is determined for a plurality threads each having a performance objective based upon real-time processing of thread performance metric data for each thread, according to one embodiment of the invention.

FIG. 4 is a flowchart illustrating a dynamic thread scheduling method 400, wherein a new scheduler quantum value is determined for a plurality of threads, each having a performance objective based upon real-time processing of thread performance metric data for each thread, according to one embodiment of the invention. The dynamic thread scheduling method 400 is similar to that of FIG. 3, except data is collected and analyzed for a plurality of threads. Therefore, the alternative embodiments contemplated for each component will also apply here.

The thread metric module 106 provides scheduling quantum optimizer 104 with thread objective data, including at least one performance metric parameter and a performance objective for a plurality of threads (operation 402). In one embodiment, the performance metric parameters include at least one of a performance metric type, a performance collector sample rate, a sample window size, and a sample interval, as similarly described above.

At operation 404, the performance collector module 108 samples performance metric data based upon parameters supplied by each thread's performance data. In one embodiment, the performance collector module 108 sends performance metric data to the scheduling quantum optimizer 104.

The scheduling quantum optimizer 104 receives the sampled performance metric data from the performance collector module 108 (operation 406). At operation 408, the scheduling quantum optimizer determines a new or modified performance objective based on each thread's performance objective. In one embodiment, only the thread with the highest priority gets an optimized scheduler value. In another embodiment, a default performance objective is used and applied to at least one thread's performance metric data.

Continuing at operation 410, the scheduling quantum optimizer 104 calculates a new scheduler quantum value based on the sampled performance metric data points and new performance objective. In one embodiment, the functions corresponding to the performance metric data points for each thread are combined to produce a new performance metric function, wherein the performance objective, such as find lowest value, is applied to the new function. It should be appreciated that many different mathematical functions are available for combining and filtering multiple functions, such as those disclosed herein.

The OS scheduler 110 receives and implements the scheduler quantum value determined by scheduling quantum optimizer 104 (operation 412). If any of the optimized threads are still active (operation 414), the process returns to operation 404 to continue the process. However, if none of the optimized threads are active, the OS scheduler 110 may continue at the last scheduler quantum value or may revert back to a default value (operation 416). If a new thread or threads with optimized data becomes active (operation 418), the system flows to operation 402 where the process begins again with new thread objective data; otherwise the system continues execution at operation 416.

Figure 5:
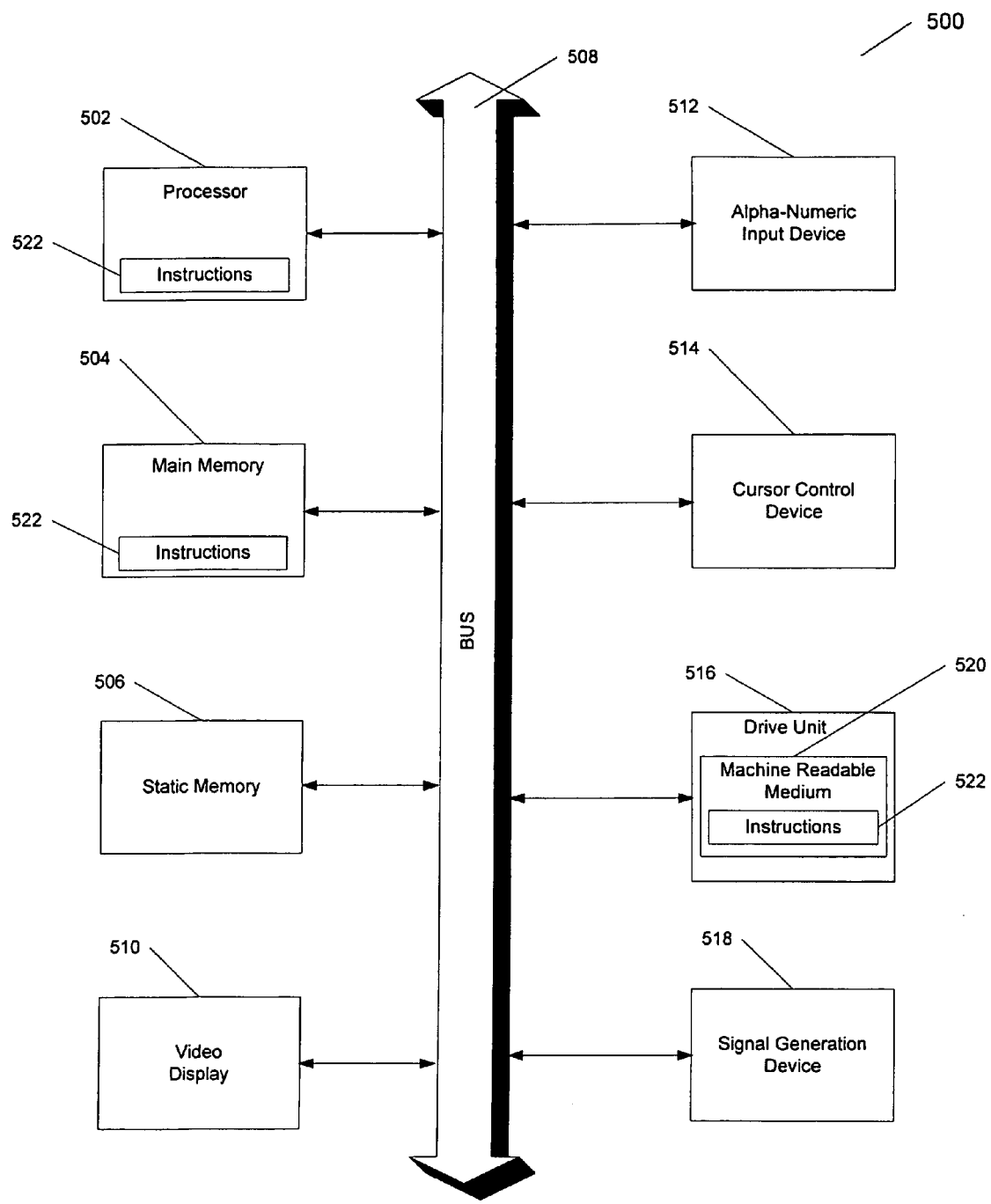
FIG. 5 is a diagrammatic representation illustrating a machine in the exemplary form of a computer system, wherein a set of instructions can be executed to cause the machine to perform any one or more of the methodologies discussed herein.

FIG. 5 is a diagrammatic representation illustrating a machine in the exemplary form of a computer system 500, wherein a set of instructions can be executed to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine can be a personal computer (PC), a tablet PC, a portable media player, a set-top box (STB), a Personal Digital Assistant (PDA), a cellular telephone, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, and a signal generation device 518 (e.g., a speaker).

The disk drive unit 516 includes a machine-readable medium 520 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable media.

While the machine-readable medium 520 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies according to embodiments of the invention. The term "machine-readable medium" shall accordingly be taken to included, but not be limited to, solid-state memories, and optical and magnetic media.

In the preceding description, for purposes of explanation, specific nomenclature is set forth to provide a thorough understanding of various embodiments of the invention. However, it will be apparent to one skilled in the art that these specific details are not required in order to practice embodiments of the invention. For example, an embodiment of the invention has been described with reference to a decode time metric. However, the same techniques can easily be applied to other types of metrics, such as encode or graphic rendering metrics.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method. The required structure for a variety of these systems will appear from the description below. In addition, one embodiment of the invention is not described with reference to any particular programming language. It will be appreciated that a variety of programming languages may be used to implement the teachings of embodiments of the invention as described herein.

A system and method for dynamic thread scheduling have been described. It will be appreciated that the embodiments of the invention described above are cited by way of example, and are not limited to what has been particularly shown and described hereinabove. Rather, the scope of embodiments of the invention may include both combinations and subcombinations of the various features described hereinabove, as well as variations and modifications thereof which would occur to persons skilled in the art upon reading the foregoing description and which are not disclosed in the prior art.

What is claimed is:

1. A computer-implemented method for performing thread scheduling, the method comprising:
   receiving thread objective data including a performance objective;
   sampling a plurality of performance metric data points for each thread, wherein each data point varies as a function of scheduling quantum values, including using a sliding window to define a set of sampled performance metric data points during real-time sampling;
   calculating a new scheduling quantum value by processing the plurality of performance metric data points according to the performance objective, wherein the performance objective is to determine the new scheduling quantum value corresponding to a minimum of the set of sampled performance metric data points, and wherein calculating the new scheduling quantum value includes using the defined set of sampled performance metric data points; and
   adjusting a current scheduling quantum value to the new scheduling quantum value.

2. The computer-implemented method of claim 1, wherein sampling the plurality of performance metric data points includes sampling a performance metric value at predetermined scheduling quantum values.

3. The computer-implemented method of claim 1, wherein the performance objective is to determine the new scheduling quantum value corresponding to an average of the set of sampled performance metric data points.

4. A computer-implemented method for performing thread scheduling, the method comprising:
   receiving thread objective data including a performance objective;
   sampling a plurality of performance metric data points for each thread, wherein each data point varies as a function of scheduling quantum values, including using a sliding window to define a set of sampled performance metric data points during real-time sampling;
   calculating a new scheduling quantum value by processing the plurality of performance metric data points according to the performance objective, wherein the performance objective is to determine the new scheduling quantum value corresponding to a maximum of the set of sampled performance metric data points, and wherein calculating the new scheduling quantum value includes using the defined set of sampled performance metric data points; and adjusting a current scheduling quantum value to the new scheduling quantum value.

5. A computer-implemented method for performing thread scheduling for multiple threads, the method comprising:
   receiving thread objective data for a plurality of threads, including a performance objective for each thread of the plurality of threads;
   sampling a plurality of performance metric data points for each thread of the plurality of threads, specific to a performance metric type, wherein each performance metric data point varies as a function of scheduling quantum values, wherein sampling includes using a sliding window to define a set of sampled performance metric data points during real-time sampling;
   determining a new performance objective based upon the performance objective for each of the plurality of threads;
   calculating a new scheduling quantum value by processing the plurality of performance metric data points for each thread according to the new performance objective, wherein the performance objective is to determine the new scheduling quantum value corresponding to a minimum of the set of sampled performance metric data points, and wherein calculating the new scheduling quantum value includes using the defined set of sampled performance metric data points; and adjusting a current scheduling quantum value to the new scheduling quantum value.

6. The computer-implemented method of claim 5, wherein the processing the plurality of performance metric data points for each thread according to the new performance objective includes combining each function corresponding to each thread's performance metric data points to produce a new performance metric function.

7. The computer-implemented method of claim 5, wherein determining the new performance objective includes choosing a performance objective corresponding to a thread with a highest priority among the plurality of threads.

8. A system, comprising:
a scheduling quantum optimizer device;
a thread metric module device to provide thread objective data including a performance objective to the scheduling quantum optimizer device; and
a performance collector hardware device to sample a plurality of performance metric data points for each thread and provide the performance metric data points to the scheduling quantum optimizer device, wherein each performance metric data point varies as a function of scheduling quantum values, wherein the performance collector module device samples the plurality of performance metric data points by using a sliding window to define a set of sampled performance metric data points during real-time sampling;
the scheduling quantum optimizer device to process the plurality of performance metric data points according to the performance objective to provide a new scheduling quantum value to a process manager device, wherein the performance objective is to determine the new scheduling quantum value corresponding to a minimum of the set of sampled performance metric data points, and wherein the scheduling quantum optimizer device calculates the new scheduling quantum value using the defined set of sampled performance metric data points, and further wherein the process manager device is to adjust a current scheduling quantum value to the new scheduling quantum value.

9. The system of claim 8, wherein to sample the plurality of performance metric data points, the performance collector module device is operable to sample a performance metric value at predetermined scheduling quantum values.

10. The system of claim 8, wherein to process the plurality of performance metric data points, the scheduling quantum optimizer device is operable to use a sliding window that defines a set of sampled performance metric data points during real-time sampling to calculate the new scheduling quantum value.

11. The system of claim 10, wherein the performance objective is to determine a scheduling quantum value corresponding to a minimum of the set of sampled performance metric data points.

12. The system of claim 10, wherein the performance objective is to determine a scheduling quantum value corresponding to a maximum of the set of sampled performance metric data points.

13. The system of claim 10, wherein the performance objective is to determine a scheduling quantum value corresponding to an average of the set of sampled performance metric data points.

14. A system, comprising:
a scheduling quantum optimizer device;
a thread metric module device to provide thread objective data for a plurality of threads, including a performance objective for each of the plurality of threads to the scheduling quantum optimizer device; and
a performance collector hardware device to sample performance metric data points for each thread of the plurality of threads specific to a performance metric type, wherein each performance metric data point varies as a function of scheduling quantum values, and further wherein the performance collector module device samples using a sliding window to define a set of sampled performance metric data points during real-time sampling;
the scheduling quantum optimizer device to determine a new performance objective based upon the performance objective for each thread of the plurality of threads and to process the plurality of performance metric data points for each thread of the plurality of threads according to the new performance objective to provide a new scheduling quantum value to a process manager device, wherein the performance objective is to determine the new scheduling quantum value corresponding to a minimum of the set of sampled performance metric data Points, and wherein the scheduling quantum optimizer device calculates the new scheduling quantum value using the defined set of sampled performance metric data points, wherein the process manager device is to adjust a current scheduling quantum value to the new scheduling quantum value.

15. The system of claim 14, wherein to process the plurality of performance metric data points for each thread according to the new performance objective, the scheduling quantum optimizer device is to combine each function corresponding to performance metric data points for each thread to produce a new performance metric function.

16. The system of claim 14, wherein to determine the new performance objective, the scheduling quantum optimizer device is to select a performance objective corresponding to the thread with a highest priority among the plurality of threads.

17. A machine-accessible storage medium that provides instructions that, if executed by a machine, will cause the machine to perform operations comprising:
receiving thread objective data including a performance objective; sampling a plurality of performance metric data points for each thread, wherein each data point varies as a function of scheduling quantum values, including using a sliding window to define a set of sampled performance metric data points during real-time sampling;
calculating a new scheduling quantum value by processing the plurality of performance metric data points according to the performance objective, wherein the performance objective is to determine the new scheduling quantum value corresponding to a minimum of the set of sampled performance metric data points, and wherein calculating the new scheduling quantum value includes using the defined set of sampled performance metric data points; and
adjusting a current scheduling quantum value to the new scheduling quantum value.

18. The machine readable storage medium of claim 17, wherein the instructions for executing the method to perform thread scheduling are coded into an operating system.

19. The machine readable storage medium of claim 17, wherein the instructions for executing the method to perform thread scheduling are coded into a high level application.

20. The machine readable storage medium of claim 19, wherein the high level application is layered above an operating system as a system service.

21. The machine readable storage medium of claim 17, wherein sampling the plurality of performance metric data points includes sampling a performance metric value at predetermined scheduling quantum values.

22. The machine readable storage medium of claim 17, wherein the performance objective is to determine the improved scheduling quantum value corresponding to a reduced performance metric value.

23. The machine readable storage medium of claim 17, wherein the performance objective is to determine the improved scheduling quantum value corresponding to an increased performance metric value.

24. The machine readable storage medium of claim 17, wherein the performance objective is to determine the improved scheduling quantum value corresponding to an average performance metric value.

25. A machine-accessible storage medium that provides instructions that, if executed by a machine, will cause the machine to perform operations comprising:
receiving thread objective data for a plurality of threads, including a performance objective for each of the plurality of threads;
sampling a plurality of performance metric data points for each thread of the plurality of threads, specific to a performance metric type, wherein each performance metric data point varies as a function of scheduling quantum values, including using a sliding window to define a set of sampled performance metric data points during real-time sampling;
determining a new performance objective based upon the performance objective for each of the plurality threads;
calculating a new scheduling quantum value by processing the plurality of performance metric data points for each thread according to the new performance objective, wherein the performance objective is to determine the new scheduling quantum value corresponding to a minimum of the set of sampled performance metric data points, and wherein calculating the new scheduling quantum value includes using the defined set of sampled performance metric data points; and
adjusting a current scheduling quantum value to the new scheduling quantum value.

26. The machine readable storage medium of claim 25, wherein processing the plurality of performance metric data points for each thread according to the new performance objective includes combining each function corresponding to each thread's performance metric data points to produce a new performance metric function.

27. The machine readable storage medium of claim 26, wherein determining the new performance objective includes choosing a performance objective corresponding to a thread with a highest priority among the plurality of threads.

28. A portable media device, comprising;
a memory module to store data;
a processor to access data stored in the memory module to receive thread objective data including a performance objective, to sample a plurality of performance metric data points for each thread using a sliding window to define a set of sampled performance metric data points during real-time sampling, wherein each data point varies as a function of scheduling quantum values, to process the plurality of performance metric data points according to the performance objective to calculate a new scheduling quantum value, and to adjust a current scheduling quantum value to the new scheduling quantum value, wherein the performance objective is to determine the new scheduling quantum value corresponding to a minimum of the set of sampled performance metric data points, and wherein the processor calculates the new scheduling quantum value using the defined set of sampled performance metric data points; and
the portable media device, including the processor and the memory.

29. The portable media device of claim 28, wherein to process the plurality of performance metric data points, the processor is operable to use a sliding window that defines a set of sampled performance metric data points during real-time sampling to calculate the new scheduling quantum value.

30. The portable media device of claim 29, wherein the performance objective is to determine a scheduling quantum value corresponding to a minimum of the set of sampled performance metric data points.

31. A portable media device, comprising;
a memory module;
a processor to access data stored in the memory module to receive thread objective data for a plurality of threads including a performance objective for each thread of the plurality of threads, to sample a plurality of performance metric data points for each thread of the plurality of threads using a sliding window to define a set of sampled performance metric data points during real-time sampling, specific to a performance metric type, wherein each data point varies as a function of scheduling quantum values, to determine a new performance objective based upon the performance objective for each thread of the plurality of threads, to process the plurality of performance metric data points for each thread according to the new performance objective to calculate a new scheduling quantum value, and to adjust a current scheduling quantum value to the new scheduling quantum value, wherein the performance objective is to determine the new scheduling quantum value corresponding to a minimum of the set of sampled performance metric data points, and wherein the processor calculates the new scheduling quantum value using the defined set of sampled performance metric data points; and
the portable media device, including the processor and the memory.

32. The system of claim 31, wherein to process the plurality of performance metric data points for each thread according to the new performance objective, the processor is to combine each function corresponding to performance metric data points for each thread to produce a new performance metric function.

33. The system of claim 31, wherein to determine the new performance objective, the processor is to select a performance objective corresponding to a thread with a highest priority among the plurality of threads.

* * * * *